T. FRANKE.
PROCESS FOR PREPARING FUEL FROM PEAT.
APPLICATION FILED MAR. 25, 1912.

1,031,638.

Patented July 2, 1912.

Witnesses:

Inventor:
Theodor Franke,
By Franks. Ankleman atty.

UNITED STATES PATENT OFFICE.

THEODOR FRANKE, OF SCHÖNEBERG, BERLIN, GERMANY.

PROCESS FOR PREPARING FUEL FROM PEAT.

1,031,638.  Specification of Letters Patent.  Patented July 2, 1912.

Application filed March 25, 1912. Serial No. 686,058.

*To all whom it may concern:*

Be it known that I, THEODOR FRANKE, a subject of the German Emperor, and residing at Wartburgstrasse 24, Schöneberg, Berlin, Germany, have invented a new and useful Improved Process for Preparing Fuel from Peat, of which the following is a specification.

This invention consists of an improved process for preparing fuel from peat containing water and of the improved product obtained thereby.

The improved process consists in placing wet peat in a press, in permanently adding combustible material in the form of partitions substantially impermeable to water during the pressing operation, and in pressing said peat and partitions into a solid mass which may be used directly as fuel or may be pulverized before being formed into briquets or the like.

The invention will now be elucidated with reference to the accompanying drawings, in which:—

Figure 1:
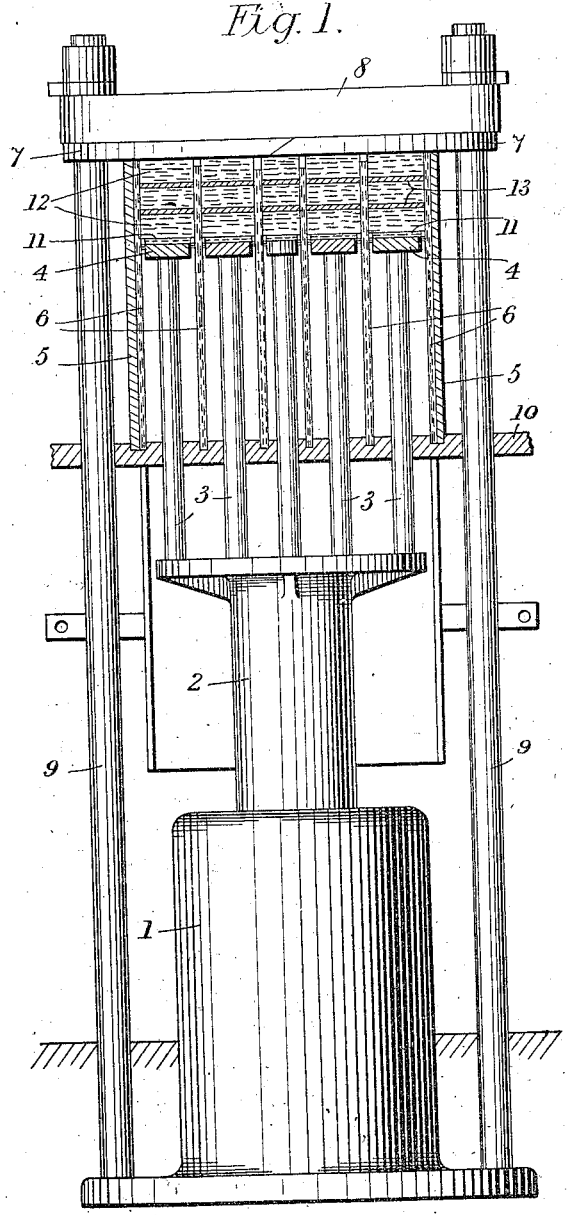
Figure 2:
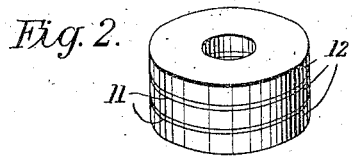

Figure 1 is a press for use in carrying the process into effect, said press containing a charge of peat with the combustible partitions embedded therein, and Fig. 2 a perspective view of an example of the product obtained by the process in the form of an annular fuel-cake of compressed peat with combustible partitions embedded therein.

Referring in the first place to Fig. 1 the peat 12 is placed in the press illustrated, combustible partitions are then embedded in the peat, the said partitions being substantially impermeable to water, that is, the partitions are of such density as to preclude absorption of moisture within the time required for ejecting the moisture from the peat. The peat and partitions are then compressed into a solid mass such as the annular cake shown in Fig. 2 formed by the material pressed by one of the annular pistons hereinafter described. The pressed product which is in the form of solid compact pieces composed of alternate layers of peat and other combustible material may be used as fuel without undergoing further treatment, or it may be ground up in any well-known or suitable manner and be formed in any suitable manner into briquets or the like composed of a mixture of peat and of the material originally in the form of partitions. Said partitions may consist of wood, paper, paste-board or other suitable combustible substances.

The press may be of any suitable form whatever. The press illustrated consists of the hydraulic cylinder 1, the ram 2, the piston-rods 3, the pistons 4, 4, the central piston being circular and the two other pistons annular, the compression chamber wall 5; the cylindrical strainers 6 concentric with said chamber wall, the two halves 7, 7 of the cover, the detachable cross-head 8, the pillars 9, 9 supporting the latter and the bars 10 supporting the compression chamber and the cylindrical strainers.

11, 11 are horizontal strainers on the upper surfaces of the pistons.

What I claim as my invention and desire to secure by Letters Patent is:—

A process of making fuel, consisting in placing layers of wet peat in a press, adding intermediate layers of combustible material substantially impervious to water, and pressing the peat and partitions into a solid mass by ejecting the moisture therefrom.

In testimony whereof I have signed my name to this specification in the presence of two subscribing witnesses.

THEODOR FRANKE.

Witnesses:
 FLORENCE AGNES POWELL,
 CLEMENT LEAN.